United States Patent [19]

Ohe et al.

[11] 4,343,324

[45] Aug. 10, 1982

[54] FLOW CONTROL VALVE

[75] Inventors: Takeshi Ohe; Haruo Okamoto, both of Matsuyama, Japan

[73] Assignee: Judosha Kiki Co., Ltd., Tokyo, Japan

[21] Appl. No.: 211,594

[22] Filed: Dec. 1, 1980

Related U.S. Application Data

[63] Continuation of Ser. No. 970,310, Dec. 18, 1978, abandoned.

[30] Foreign Application Priority Data

Jul. 19, 1977 [JP] Japan ................................. 52-96014

[51] Int. Cl.³ ............................................. G05D 11/00
[52] U.S. Cl. ................................................... 137/117
[58] Field of Search ................................. 137/117, 491

[56] References Cited

U.S. PATENT DOCUMENTS

| 3,005,463 | 10/1961 | Van Meter | 137/117 |
|---|---|---|---|
| 3,152,603 | 10/1964 | Zeisloft | 137/117 |
| 3,314,495 | 4/1967 | Clark et al. | 137/117 |
| 3,415,266 | 12/1968 | Brady et al. | 137/117 |
| 3,426,785 | 2/1969 | Brady et al. | 137/117 |
| 3,532,106 | 10/1970 | Greune et al. | 137/117 |
| 3,581,760 | 6/1971 | West | 137/117 |
| 3,642,019 | 2/1972 | Kramer | 137/117 |
| 4,148,336 | 4/1979 | Leinemann | 137/491 |

FOREIGN PATENT DOCUMENTS 649530 10/1962 Canada ................................. 137/117

Primary Examiner—H. Jay Spiegel
Attorney, Agent, or Firm—Sughrue, Mion, Zinn, Macpeak & Seas

[57] ABSTRACT

A flow-control valve exhibits a flow-drooping characteristic such that the liquid supply into an oil pressure mechanism is decreased in response to an increase of the amount of liquid discharge from a pump. The pump outlet passage forms branches into a fluid supply passage communicating with an oil pressure mechanism and a recirculating passage back to an oil tank. A control valve located in the recirculating passage is opened in response to the fluid increase from the pump to recirculate a part of the fluid into the tank. An orifice not receiving large influences of the pressure variation is disposed either at the pump outlet passage or the recirculating passage and a variable orifice valve is disposed in the fluid supply passage. The variable orifice is controlled by the pressure differential existing between the upstream and downstream portions of the orifice at either location. When the pressure differential is large, the area of the variable orifice becomes small to thereby obtain the fluid drooping characteristic.

8 Claims, 10 Drawing Figures

FLOW CONTROL VALVE

This is a continuation of application Ser. No. 970,310, filed Dec. 18, 1978, now abandoned.

BACKGROUND OF THE INVENTION

This invention relates to a flow-control valve having a flow-drooping characteristic, more specifically to a valve wherein the liquid supply amount into an oil pressure mechanism is decreased in response to an increase of the amount of liquid discharge from a pump.

Flow-control valves having the drooping characteristic has been generally used for power assisted steering systems of vehicles in order to permit stabilized vehicle body steering during high speed running and also to permit steerage with excellent steerage force.

As is well known, shown by a solid line in FIG. 8 is a relationship between a steerage force required by a driver and the vehicle speed in the case of no employment of the power assisted steering system. In this case, generally, a relatively large steerage force is required, and the force is gradually reduced with the increase of the vehicle speed. Shown by a chain line in FIG. 8 is the relationship the case of the employment of the conventional power assisted steering system. In this case a relatively smaller steerage force is required in comparison with the solid line, and in the low speed range such as city driving or garaging, such a conventional system may be appropriate, since relatively low steerage force is required in this range. However, in case of high speed running of the vehicle, the driver is dissatisfied with the light steerage force and further such light steerage force may cause the over turning of the steering wheel, resulting in the possibility of a traffic accident at high speed. Therefore a novel power assisted steering system having characteristics as shown by a broken line in FIG. 8 has been requested, which obviates the extremely reduced steerage force with the increase of the vehicle speed.

In another aspect, there is another relationship between the steerage force required by the driver and the pressure variation in the power assisted steering system due to the variation of rotation angle of the steering wheel while maintaining constant vehicle speed. That is, in the case of no employment of the power assisted steering system, the driver feels small steerage force during steerage to maintain straight running of the vehicle. However, in case of the steering wheel being rotated in accordance with the curvature of the road, a high steerage force is required. Therefore, demand has been made to provide a power assisted steering system which reduces and minimizes this steerage force differential in response to the rotation angle of the steering wheel.

In one conventional flow-control valve, generally, the amount of fluid recirculated from an outlet passage of the pump to the recirculating passage and the amount of fluid passing through the fluid supply passage into the power assisted steering system are controlled by a single spool valve. Hence, any variation of fluid pressure due to operation of the power assisted steering causes a variation of the choking amount of orifice in the fluid supply passage. This in turn causes a variation of the fluid supply amount into the power steering system in response to the fluid pressure increase during steerage.

Such a conventional flow-control device is shown in U.S. Pat. No. 3,426,785 as illustrated in FIG. 10.

This prior art patent generally shows a fluid flow-control device for power steering using a pressure actuated spool valve. The valve spool 119 is shiftable in a housing having a valve port 112, and a bypass port 121 that is connected to the inlet and outlet of the valve. The pump outlet 113 communicates with an upstream surface area of the spool 119 to urge axial bypass opening movement of the spool for increasing the bypass flow between the valve port and the bypass port. The pump outlet also communicates with the high pressure side of the steering gear via a constant metering orifice 129 and a variable metering orifice 127 and is also in fluid communication with a downstream surface area of the spool via a restricted trigger orifice 141. This cooperates with a valve biasing spring 144 to oppose bypass opening movement and as a result the pressure differential across the metering orifice is a constant determined by the reaction of the biasing spring. A pressure relief valve 150 in communication with the downstream surface area operates to exhaust fluid pressure at a maximum safe pressure that is predetermined. As a result of the restricted flow from the trigger orifice, a small pressure relief flown from the downstream surface area results in a large pressure drop and a corresponding large increase in the bypass flow.

As shown in FIG. 10, a chamber A is connected to a hydraulic pump to receive fluid therein, a chamber C is connected to a power steering system and a chamber D is connected to a bypass passage to recirculate the fluid into the pump.

The device according to this patent has the characteristics shown in FIG. 9, wherein the relationship between the rotation speed of the pump and the fluid supplying amount into the P.S. system is shown. As is evident from broken lines of FIG. 9, in case the rotation angle of the wheel is large (pressure in the power assisted system is large), the fluid supplying amount into the power steering system becomes large in comparison with the case in which the rotation angle of the handle is small, (pressure in the power assisted system is small), to thus complement steerage force during steerage at a high rotation angle of the wheel. Therefore, approximately uniform steerage force is obtainable regardless of the rotation angle of the handle.

However still another demand has been made to provide the novel power assisted steering system capable of providing small differential steerage force depending upon the rotation angle of the wheel. Therefore, it is necessary for the novel device to supply a given fluid amount into the power assisted steering system regardless of the vehicle speed or rotation angle of the handle.

In the above U.S. Patent, referring to FIG. 10, the fluid amount flown into the power steering system is determined by the fluid pressures $P_1$, $P_2$, $P_3$ ($=0$), and the opening areas, $S_1$ $S_2$, $S_3$, of the constant metering orifice 129, variable metering orifice 127 and bypass port 121, dependent upon the movement of the spool 119, respectively.

For example, in case of no load, namely in case of substantially no rotation of the wheel, the pressure $P_2$ does not become large as is clear from FIG. 9, so that the fluid amount flown into the power steering system is determined by the inner pressure differentials $P_1-P_2$ and $P_1-P_3$ and the opening area ratio $S_1/S_3$. If the wheel is greatly rotated to increase the pressure $P_2$, the differential $P_1-P_3$ is larger than the differential $P_1-P_2$, so that the valve 119 is moved toward the right to maintain the fluid amount supplied into the power steering system, resulting in that the opening area $S_2$ of the variable metering orifice 127 becomes large to increase the fluid amount supplied into the power steering system.

Such pressure variation causes the fluid supplying amount into the power steering system to change, to thereby vary the steerage force. Therefore it would be difficult to obtain stabilized steerage operation.

Another kind of valve has been proposed wherein a metering rod is disposed in the fluid supply passage connected to the power-steering system in order to control the choking amount. Such a conventional flow control valve system is shown in U.S. Pat. No. 3,314,495 and Japanese Patent Application Publication (OPI) No. 48-83530.

The valve control system uses a spool valve disposed, and movable within a hollow bore of a valve body. A spring located at one end of the bore is used to bias the spool valve. An orifice is formed in the valve body at an end opposite the spring for directing fluid from an internal hydraulic circuit inside the valve body to an external hydraulic circuit. As in other prior art arrangements the valve body has an ingress port for directing fluid from a source at increased pressure against the spool valve and a bypass port is controlled by the spool valve to a zone of reduced pressure. The spool valve is responsive to the flow rate through the orifice as represented by the pressure rate differential between the internal and external circuits. The valve system uses a metering rod that extends into the flow orifice of the valve body to reduce the effective cross-sectional area thereof for movements of the valve related to vehicular speed. This gives the valve system a drooping flow characteristic. However, the metering rod must be machined with high accuracy to coaxially provide it into the choke opening. Similar drawbacks in terms of variation of the flow amount as mentioned above are also present in this conventional device. Further, upon axial movement of the metering rod, the tapered or stepped metering surface provides a resistant force in choking the opening so that smooth movement of the rod in response to the fluid pressure is not obtainable.

SUMMARY OF THE INVENTION

It is therefore an object of this invention to overcome the above mentioned drawbacks and to provide an improved flow-control valve which permits stable flow-control regardless of the pressure variation in the power assisted steering system.

It is another object of this invention to provide an improved flow-control valve that permits stable flow-control and is easily manufactured.

Briefly, and in accordance with the present invention, a pump outlet passage is branched into a fluid supply passage communicating with an oil pressure mechanism, such as a power assisted steering system and a recirculating passage directly communicating with an oil tank.

A control valve disposed in the recirculating passage is opened in response to the fluid increased supplied from the pump to recirculate a part of the fluid into the tank. An orifice which does not receive large influences of the pressure variation is disposed either at the pump outlet passage or the recirculating passage, and a variable orifice valve is disposed at the fluid supply passage. The variable orifice valve is controlled by the pressure differential existing upstream and downstream of the orifice disposed at either the pump outlet passage or the recirculating passage. In case the pressure differential is large, that is, the flow amount is large, the opening area of the variable orifice valve becomes small to thereby obtain fluid drooping characteristic.

DETAILED DESCRIPTION OF THE PREFERRED EMBODIMENTS

Figure 1:
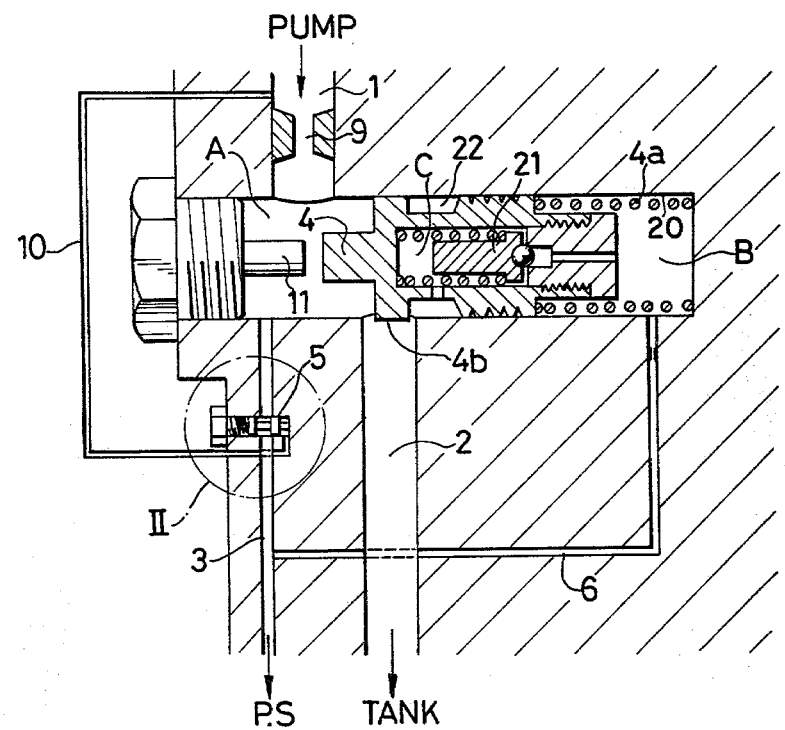
FIG. 1 shows a cross-sectional elevation of a flow-contol valve according to the first embodiment of the present invention.

A first embodiment of the present invention is shown in FIG. 1, wherein reference numeral 1 shows a pump outlet passage, and numerals 2 and 3 designate a recirculation passage and a supply passage, respectively. Each branch from the pump outlet passage 1. The recirculation passage 2 directly communicates with an oil tank (not shown) and the supply passage 3 communicates with the oil tank through a power assisted steering system (not shown in the drawings).

A spool valve 4 is provided in a valve bore 20 to control the communication area between the pump outlet passage 1 and the recirculation passage 2. A variable orifice valve 5 is disposed in the fluid supply passage 3. The spool valve 4 senses a pressure differential existing upstream and downstream of the variable orifice valve 5 by a passage 6 having one end connected to the fluid supply passage 3 and the other end connected to a chamber B of the valve bore 20. In chamber B a biasing spring 4a is disposed to normally urge the spool valve 4 toward a stopper 11 extending from chamber A in the valve bore 20.

When the fluid supply amount in the fluid supply passage 3 reaches a predetermined level, the pressure differential reaches a predetermined level to urge the spool valve 4 toward the right against the biasing force of the spring 4a. A land portion 4b of the spool valve 4 opens openings to the pump outlet passage 1 and the recirculation passage 2 to thereby permit fluid communication therebetween.

Figure 2:
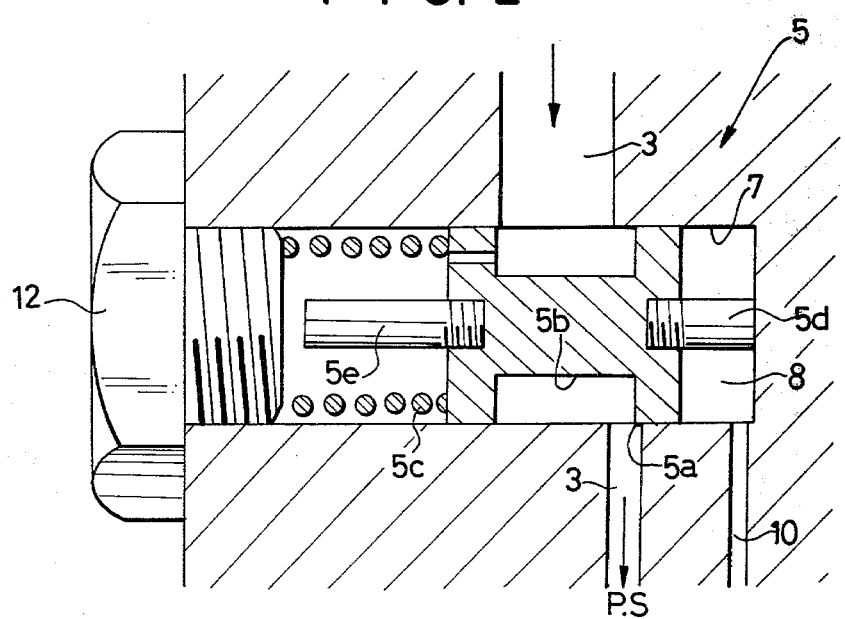
FIG. 2 shows an enlarged cross-sectional view of a portion II shown in FIG. 1.

As shown in FIG. 2, in the variable orifice valve 5, a valve bore 7 positioned perpendicular to the fluid supply passage 3 is provided with a spool 5b having a land portion 5a slidably engaged with the bore 7 to control the choking amount i.e., the opening area of the fluid supply passage 3. A spring 5c is disposed in the valve bore 7 to urge the spool 5b toward the right, i.e. the direction for increasing the opening area of the fluid supply passage 3. A pair of stopper pins 5d, 5e extend from both side faces of the spool 5b to restrict the sliding stroke of the spool to thereby obtain the maximum and minimum opening areas. Hence, first and second flowing amounts are determined.

A chamber 8 defined by the valve bore 7 and the spool 5b is in fluid communication with the upstream portion of an orifice 9 formed in the pump outlet passage (FIG. 1) by a passage 10. Therefore, the pressure differential between the chamber 8 and the fluid supply passage 3, namely the pressure differential existing between the upstream and the downstream portions of orifice 9 urges the spool 5b against the biasing force of the spring 5c. A bolt 12 is provided to serve as a cap to close the valve bore 7. The stopper 5e abuts on the bolt 12 to determine the second flow amount.

In FIG. 1, reference numeral 21 designates a relief valve that functions in a conventional manner. Namely, if fluid pressure in the bore 20 is suddenly increased due to immediate steerage operation, the valve 21 will move toward the left to permit fluid communication between the chamber B and the recirculation passage 2 through a chamber C and an annular groove 22.

Figure 3:
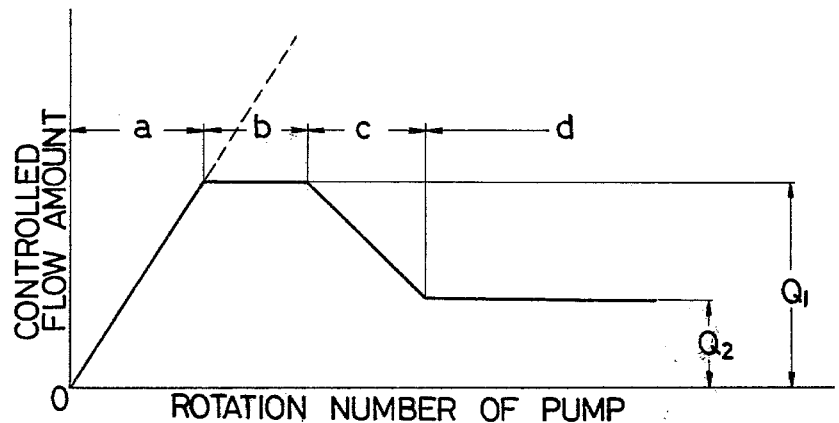
FIGS. 3 through 5 show graphical representations showing the relationship between the rotation speed of the pump and fluid amount supplied into the oil pressure mechanism (controlled flow amount)

With this structure, the flow amount flowing in the fluid supply passage 3 (hereinafter referred to controlled fluid amount) can be controlled as shown in FIG. 3. That is, during the low speed rotation range of the pump driven by a vehicle engine, namely during small amount of fluid discharge from the pump, the spool valve 4 will abut on the stopper 11 by the biasing force of the spring 4a to block the recirculation passage 2 by the land 4b. In the variable orifice valve 5, the stopper pin 5d which determines a first flowing amount abuts the valve bore 7 by the biasing force of the spring 5c to thereby maintain maximum opening area of the fluid supply passage. Therefore, all of the fluid discharged from the pump will flow into the fluid supply passage 3 as shown in region (a) in FIG. 3.

When a controlled fluid amount reaches the predetermined level, the spool valve 4 is urged toward the right in FIG. 1 against the biasing force of the spring 4a by the pressure differential existing between upstream and downstream portions of the variable orifice valve 5. This differential will move the land 4b to establish fluid communication between the pump outlet passage 1 and the recirculation passage 2. Therefore the controlled fluid amount remains constant as shown in region (b) in FIG. 3. In this case the spool 5b of the variable orifice valve is not moved.

When the fluid amount discharged from the pump is further increased, the spool 5b of the variable orifice valve 5 is moved toward the left in FIG. 2 against the biasing force of the spring 5c by the pressure differential existing between the upstream and the downstream portions of the orifice 9. As a result, the land 5a is moved in a direction to close the fluid supply passage 3, and the fluid amount flowing in the passage 3 is reduced. Simultaneously, the pressure differential between the upstream and the downstream portions of variable orifice valve 5 is further increased, so that the spool valve 4 is urged toward the right to increase flow amount into the recirculation passage 2. Since the pressure differential between the upstream and the downstream of the orifice 9 increases with the increase of flow amount discharged from the pump, the spool 5b will further reduce the opening area of the fluid supply passage 3 to reduce the controlled flow amount. This is shown in region (c) of FIG. 3.

When the stopper pin 5e which determines second flow amount abuts bolt 12, the opening area of the fluid supply passage 3 is maintained at a minimum level. This is shown in region (d) of FIG. 3. The broken line shown in FIG. 3 represents an actual flow amount discharged from the pump into the valve system. The differential between the fluid amounts shown in the broken line and the solid line is fluid amount flowing into the recirculation passage for each of the regions.

According to the present invention, even if the fluid pressure in the supply passage 3 is increased by actuation of the power assisted steering system, the position of the spool 5b of the variable orifice valve 5 is maintained such that the flow amount at the orifice 9 in the passage 1 is not changed. Therefore, controlled fluid flow is maintained constant regardless of the pressure variation in the fluid supply passage 3 to thereby obtain a stabilized fluid output for the power assisted steering system.

Figure 4:
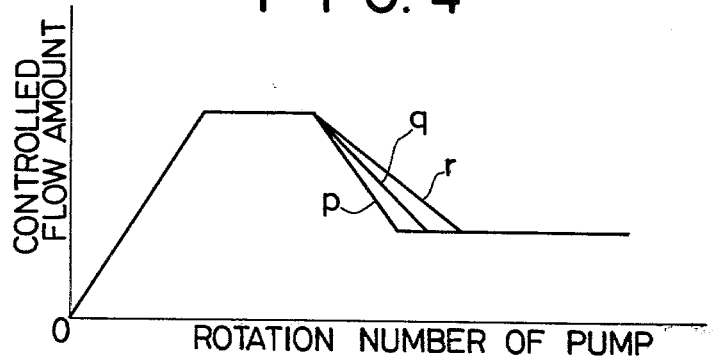
Figure 5:
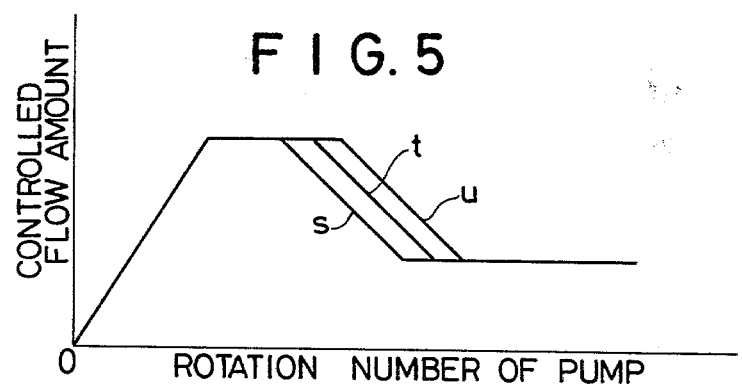

The first flow amount $Q_1$ and the second flow amount $Q_2$ shown in FIG. 3 can be controlled by changing the longitudinal length of the stopper pins 5d and 5e. Furthermore, as shown in the lines p, q, r, in FIG. 4 or lines s, t, u, in FIG. 5, the drooping characteristic can be controlled by changing the spring coefficient of the spring 5c.

Figure 6:
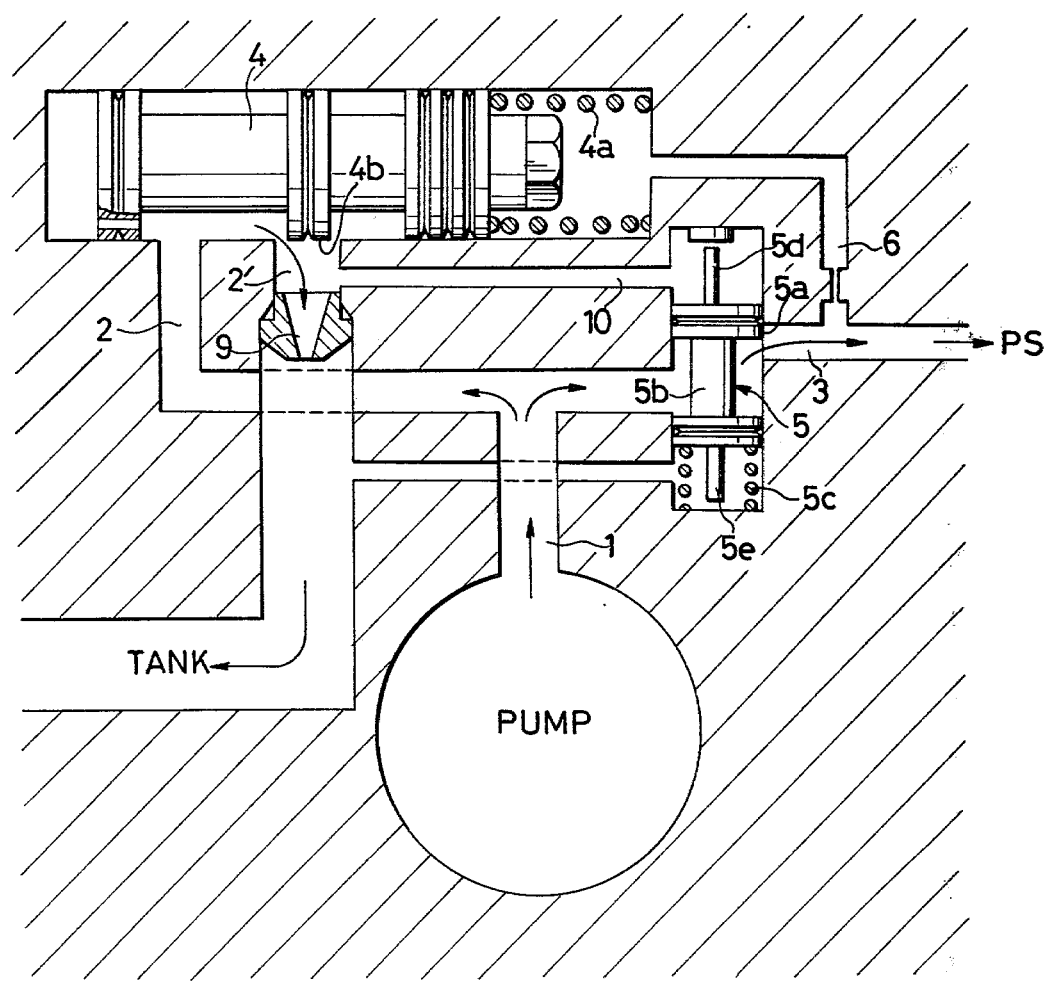
FIG. 6 shows a cross-sectional elevation of a flow-control valve according to the second embodiment of the present invention.

A second embodiment of the present invention is shown in FIG. 6, wherein like parts and components are designated by the same reference numerals and characters as those shown in FIGS. 1 and 2. According to this embodiment, an orifice 9' provides the pressure differential to be applied to the variable orifice valve 5. The orifice 9' is disposed in the recirculation passage 2'. During small amounts of fluid discharge from the pump, the fluid pressure does not provide a sufficient rightward urging force against the leftward biasing force of the spring 4a, so that the fluid does not flow into the recirculation passage 2' but will flow into the power steering system through the passage 3.

When the fluid amount reaches a predetermined level, the land 4b will move rightwardly by the fluid pressure against the biasing force of the spring to open the port of the recirculation passage 2'. When the fluid amount is further increased, the fluid pressure in the passage 2' is increased to urge the spool 5b downwardly against the biasing force of the spring 5e to thereby narrow the port of the passage 3, so that the controlled flow amount is reduced. A further reduction of the controlled flow amount is terminated when the stopper 5e abuts on the bore wall.

It is evident that the same function is obtainable in this embodiment as obtained in the first embodiment subject to the following differences:

(1) Since the pressure differential between the upstream and the downstream of the orifice 9' to be applied to the variable orifice valve 5 is not generated until the spool valve 4 opens the passage 2', selective range of valve characteristic would be restricted.

(2) The orifice 9' must be provided at the place other than the immediately below the spool valve 4, since negative pressure may be generated thereat.

Figure 7:
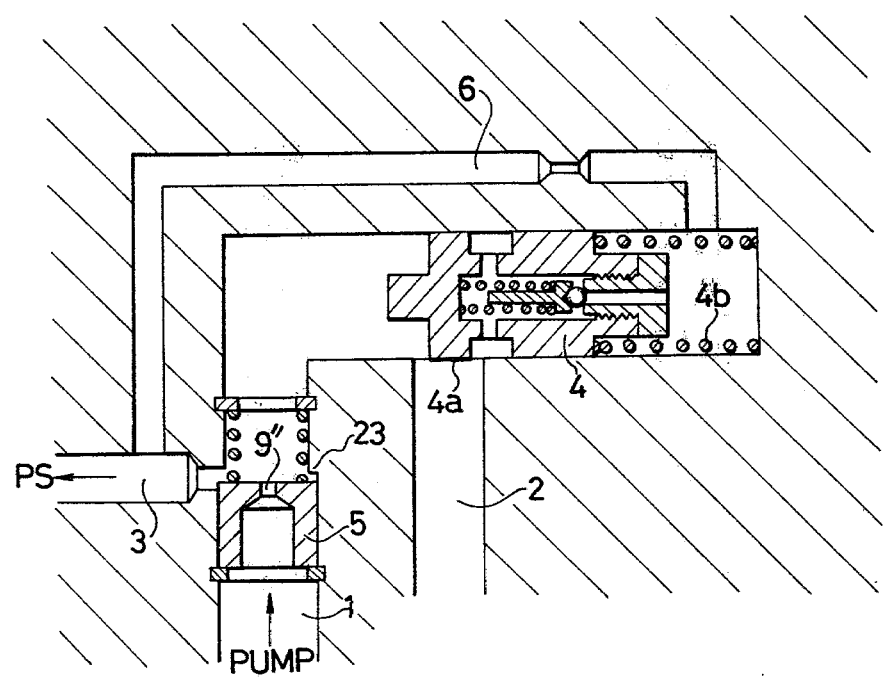
FIG. 7 shows a cross-sectional elevation of a flow-control valve according to the third embodiment of the present invention.
Figure 8:
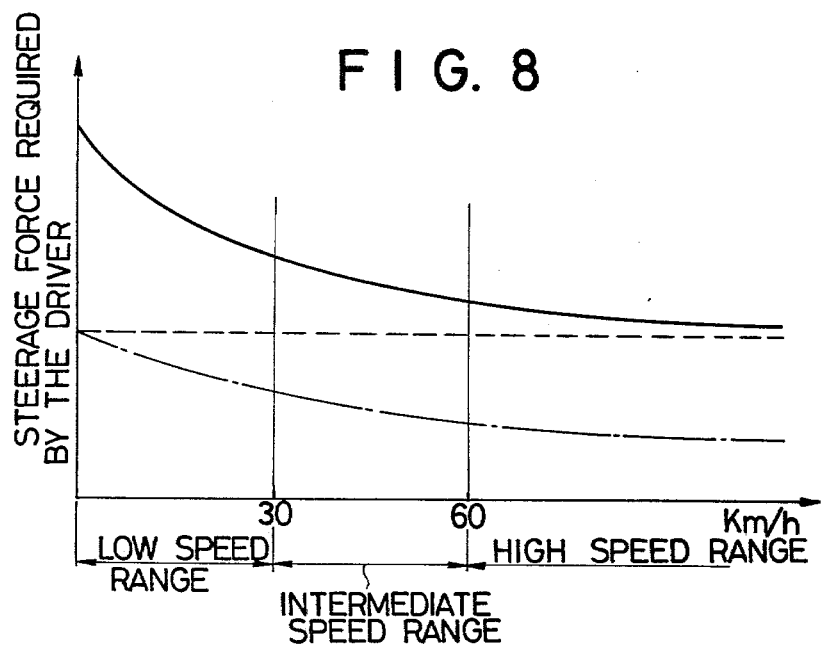
FIG. 8 is a graphical representation showing the relationship between the vehicle speed and the steerage force.
Figure 9:
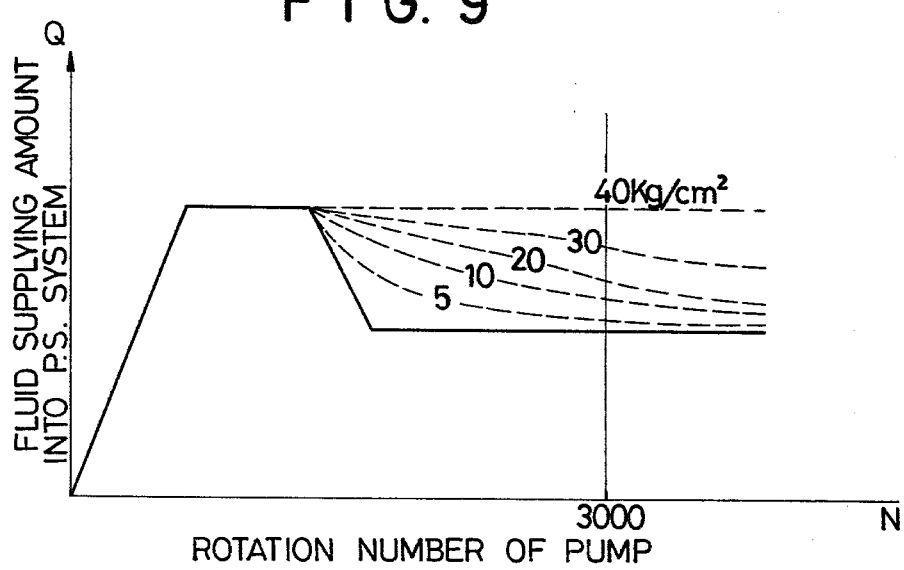
FIG. 9 is a graphical representation showing the relationship between the speed of rotation and the fluid supplying amount into a power steering system according to the prior art.
Figure 10:
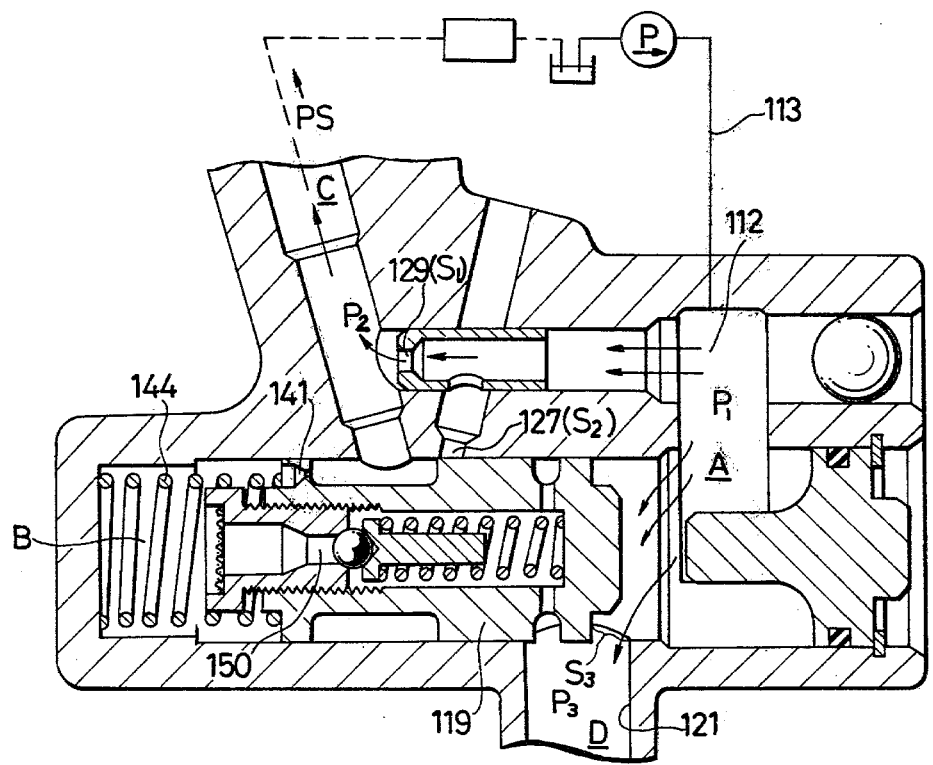
FIG. 10 shows a cross-sectional view of the conventional flow control valve.

A third embodiment according to the present invention is shown in FIG. 7, wherein an orifice 9" is slidingly disposed in the pump outlet passage 1. During the period of small fluid discharge from the pump, the fluid pressure does not provide a sufficient rightward urging force against the leftward biasing force of the spring, so that a port of the passage 2 is closed and all of the fluid will flow into the power steering system through the passage 3.

When the fluid discharge amount from the pump reaches a predetermined level, the valve 4 is moved toward right against the biasing force of the spring 4b to allow fluid to flow into the recirculation passage 2, so that the flow amount into the passage 3 is maintained in constant.

When the fluid discharge amount is further increased, the orifice 9" is moved upwardly to narrow a part of the passage 3 to reduce flow supply amount into the power steering system to thereby obtain the drooping characteristic.

When the fluid discharge amount is further increased, the orifice 9" abuts on a stepped portion 23, so that fluid supply amount into the passage 3 is maintained in minimum.

What is claimed is:

1. A valving system for a power assist hydraulic system comprising: means defining an external utilization hydraulic circuit having an intake section; a pump for supplying hydraulic fluid and an internal hydraulic circuit receiving said fluid; said internal circuit including sensor means to divert fluid from delivery to said external circuit to a recirculation passage when a predetermined level exists; said sensor means including first valve means responsive to the pressure at said pump outlet, an orifice disposed at an outlet passage of said pump, said first valve means being responsive to the pressure differential across said orifice, such that, upon said pressure differential exceeding a predetermined value, said first valve means operates to reduce fluid delivery to said external circuit to a predetermined minimum positive fluid delivery rate, and second valve means located upstream of, and responsive to, the pressure differential upstream and downstream of said first valve means, whereby when the fluid supply in said intake section reaches a predetermined level said second valve means diverts flow of hydraulic fluid from said intake to said recirculation passage while said first valve means allows at least said predetermined minimum positive fluid delivery rate, and wherein said orifice is arranged in the fluid flow downstream of said pump and upstream of said first and second valve means.

2. The system of claims 1 wherein said first valve means comprises a valve bore, a sliding member disposed in said bore, said sliding member having a land portion dividing said bore into two compartments, the first held at pressure upstream of said orifice and the second held at pressure downstream of said orifice, means to bias said sliding member against the pressure existing upstream of said orifice and means establishing communication between said second compartment and said intake section of said external hydraulic circuit.

3. The system of claim 2 wherein said slider further comprises means to establish maximum and minimum flow rates through said valve means to said intake section.

4. The system of claim 2 wherein said means to establish maximum and minimum flow rates comprises stoppers disposed on opposite sides of said slider.

5. The system of claim 1 wherein said second valve means comprises a valve bore, a spool valve member disposed in said bore, said spool valve member having a land portion dividing said bore into two chambers, the first chamber receiving fluid under pressure from said pump and the second receiving fluid under pressure downstream of said first valve means, means to bias said spool member against the fluid pressure from said pump, and means establishing fluid communication between said first chamber and said recirculation passage.

6. The system of claim 5 wherein said spool valve member further comprises relief valve means to reduce the pressure in said second chamber as a result of an increase in pressure in said external circuit.

7. The system of claim 6 further comprising means disposed in said second chamber to define a limit of travel for said spool valve member.

8. The system of claim 6 further comprising means disposed on said spool valve member to define a limit of travel of said spool valve.

* * * * *